(12) United States Patent
Parthasarathy et al.

(10) Patent No.: US 8,260,651 B2
(45) Date of Patent: Sep. 4, 2012

(54) METHOD AND SYSTEM FOR ESTIMATING RESOURCE FACTORS FOR EXECUTING A PROJECT

(75) Inventors: Mandyam Anandanpillai Parthasarathy, Karnataka (IN); Aman Kumar Singhal, Karnataka (IN); Amit Arun Javadekar, Maharashtra (IN); Shobha Mahadevappa, Karnataka (IN); Subbarao Krishnaswamy, Karnataka (IN); Meera Rajeevan, Karnataka (IN)

(73) Assignee: Infosys Technologies Limited (IN)

( * ) Notice: Subject to any disclaimer, the term of this patent is extended or adjusted under 35 U.S.C. 154(b) by 354 days.

(21) Appl. No.: 12/558,944

(22) Filed: Sep. 14, 2009

(65) Prior Publication Data

US 2010/0070325 A1    Mar. 18, 2010

(30) Foreign Application Priority Data

Sep. 15, 2008  (IN) .......................... 2233/CHE/2008

(51) Int. Cl.
*G06F 9/46* (2006.01)
(52) U.S. Cl. ...................................................... 705/7.23
(58) Field of Classification Search .................. 705/7.23
See application file for complete search history.

(56) References Cited

U.S. PATENT DOCUMENTS

| | | | | |
|---|---|---|---|---|
| 5,381,332 A | * | 1/1995 | Wood | 705/7.25 |
| 6,289,340 B1 | * | 9/2001 | Puram et al. | 705/7.14 |
| 6,308,164 B1 | * | 10/2001 | Nummelin et al. | 705/7.23 |
| 6,662,194 B1 | * | 12/2003 | Joao | 705/1.1 |
| 7,155,400 B1 | * | 12/2006 | Jilk et al. | 705/7.14 |
| 7,178,147 B2 | * | 2/2007 | Benhase et al. | 718/104 |
| 7,523,045 B1 | * | 4/2009 | Walker et al. | 705/7.14 |
| 7,765,553 B2 | * | 7/2010 | Douceur et al. | 718/107 |
| 2003/0195789 A1 | * | 10/2003 | Yen | 705/9 |

OTHER PUBLICATIONS

Frances (Forecasting in Marketing) Aug. 2004, Econometric Institute Report, EI 2004-40, pp. 984-1012.*

* cited by examiner

*Primary Examiner* — Romain Jeanty
(74) *Attorney, Agent, or Firm* — Cantor Colburn LLP

(57) ABSTRACT

The present invention provides a method, system and computer program product for estimating resource factors for a steady state execution of a project. The resource factors are associated with a second set of resources. A required effort associated with a first set of resources executing the project is received. Thereafter, a primary effort estimate is calculated. Subsequently, first pre-defined parameters and second pre-defined parameters are assigned corresponding weights. A value corresponding to each of the resource factors is then generated on the basis of the primary effort estimate, weighted first pre-defined parameters and weighted second pre-defined parameters and available time associated with the second set of resources.

20 Claims, 3 Drawing Sheets

METHOD AND SYSTEM FOR ESTIMATING RESOURCE FACTORS FOR EXECUTING A PROJECT

BACKGROUND

The present invention relates to the estimation of resource factors associated with execution of a project.

With the advent of outsourcing in the last two decades, various organizations started outsourcing/redirecting their work to companies that provided them with cost and time benefits. For example, an insurance company in the USA may wish to outsource the maintenance of a set of its financial applications to an Information and Technology Enabled Services (ITES) organization in India for cost and time benefits. Few examples of the work that is outsourced include development of online shopping portals for retail stores, maintenance of existing banking and financial applications, and legal and process documents, and the like.

The companies typically prepare an estimate of such work/projects in terms of resource factors associated with the projects, for example, the estimated number of hours to complete the project, the required number of people to execute the project, and the like. Initially, organizations used to outsource small projects in terms of the amount and budget; therefore, it was easy to estimate the effort required to execute the projects. An example of a small project can be a project for developing a small application used to collect a time stamp associated with each employee in a firm. Further, these projects required less amount of forecasting in terms of effort and were easy to execute.

However, with the exponential growth in business, the amount and complexity of the work being outsourced has increased. An example of a complex project can be the development and maintenance of a finance application for multinational bank. Further, the expectation levels of organizations in terms of various parameters, such as quality, process management, infrastructure, skill set of the people working on the project, requirement of the people to work in their environment, and the like, have also risen substantially. The estimation of the various resource factors for such projects has become a tedious and error-prone process, since the companies continue to estimate the factors on the basis of their experience and small-scale projects.

In light of the above discussion, there is a need for a method, system and computer program product for estimating the resource factors associated with a project. Further, the estimation should result in an objective value corresponding to the resource factors in order to enable the companies to forecast efficiently and thereby make the estimation process less error-prone.

SUMMARY

An object of the invention is to estimate one or more resource factors associated with a project.

To achieve the objective mentioned above, the invention provides a method, system and computer program product for estimating one or more resource factors associated with a steady state execution of a project. The project is executed by a second set of resources. The method receives a required effort associated with a first set of resources to execute the project. Further, a primary effort estimate is calculated based on the required effort and a pre-determined efficiency. Thereafter, a first weight and a second weight are assigned to various first pre-defined parameters and second pre-defined parameters respectively. The first pre-defined parameters are associated with engagement characteristics of the project and the second pre-defined parameters are associated with portfolio characteristics of the project. Subsequently, a value corresponding to each of the resource factors is calculated, based on the primary effort estimate, available time with the second set of resources, and the weighted first pre-defined parameters and second pre-defined parameters.

The method, system and computer program product described above have several advantages. The method enables the estimation of various resource factors associated with a project on the basis of the requirements of the project. Further, since the resource factors are estimated on the basis of a comprehensive list of parameters, objective values, thus obtained, corresponding to the resource factors, are accurate and reliable. Such estimation of the resource factors is an efficient and less error-prone process. Furthermore, the resource factors are estimated for a period of time, for example, estimation of the number of people required to be staffed on a project for the next five years, and, therefore, helps an organization to forecast for a long period of time.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DESCRIPTION OF VARIOUS EMBODIMENTS

The invention describes a method, system and computer program product for estimating various resource factors associated with a project. These resource factors affect the steady state execution of the project. Further, the project is redirected by a first set of resources to a second set of resources. The estimation of the resource factors enables the second set of resources to efficiently execute the project.

Figure 1:
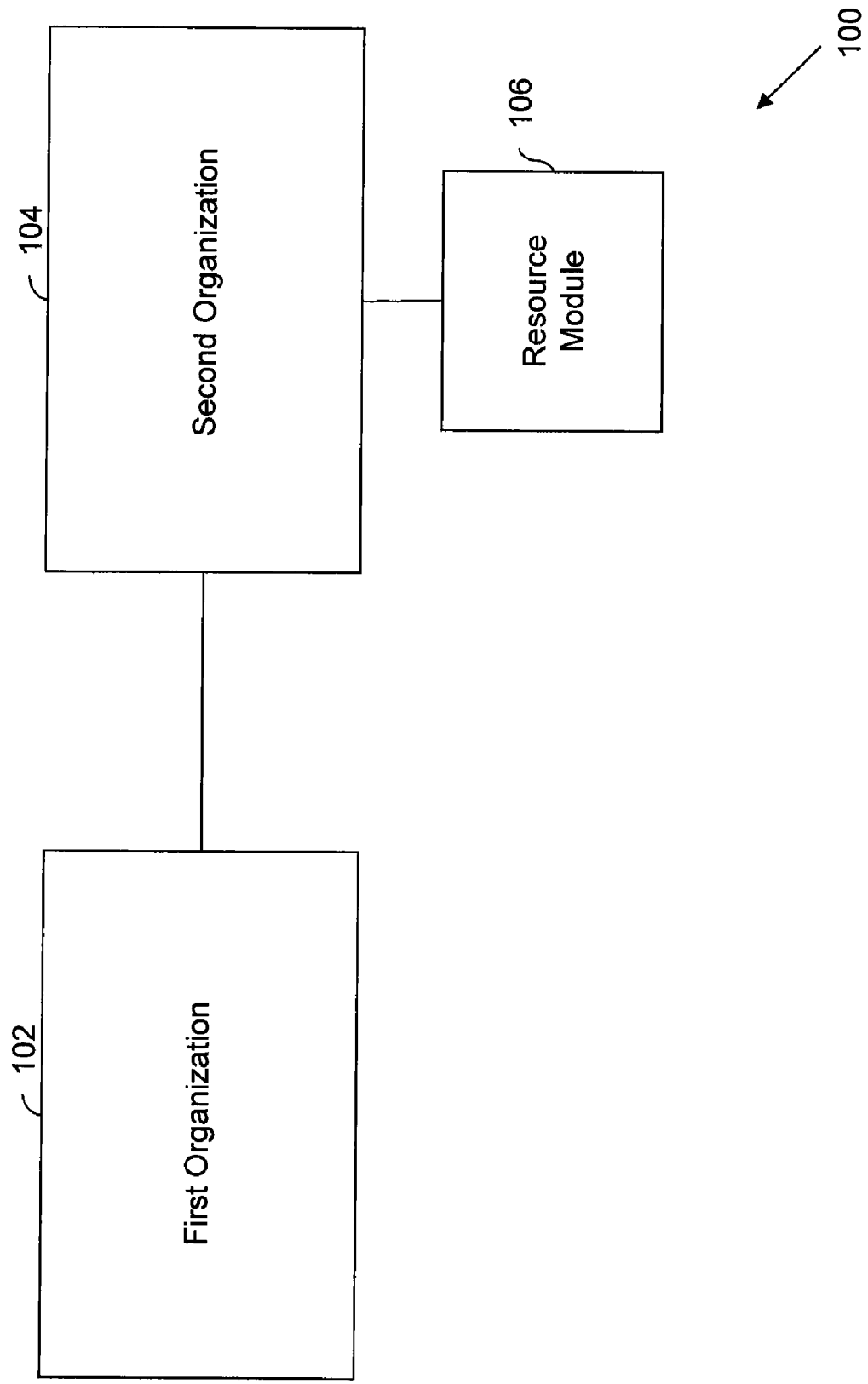
FIG. 1 illustrates an environment in which various embodiments of the invention may be practiced.

FIG. 1 illustrates an environment 100 in which various embodiments of the invention may be practiced. Environment 100 includes a first organization 102, a second organization 104 and a resource module 106.

First organization 102 is an organization that outsources/redirects its work to second organization 104. It may be apparent to any person skilled in the art that the work can be a project that first organization 102 wants to be executed by second organization 104. For example, an insurance company in the USA may wish to outsource the maintenance of a set of its financial applications to an Information Technology Enabled Services (ITES) organization in India. In this example, first organization 102 is the insurance company and second organization 104 is the ITES organization. In an embodiment of the invention, first organization 102 outsources the work being performed by its employees, hereinafter referred to as a first set of resources, to a second set of resources associated with second organization 104. It may be apparent to any person skilled in the art that the first set of resources are the employees of first organization 102 currently working on the project. In another embodiment of the invention, first organization 102 outsources a work equivalent to a particular number of hours of effort to second organization 104, to be performed by the second set of resources.

In various embodiments of the invention, second organization 104 estimates one or more resource factors associated with the project before the commencement of the steady state execution of the project. Various examples of the resource factors include, but are not limited to, an effort estimate associated with the project, the number of Full Time Equivalents (FTEs) required to be staffed on the project, the number of project managers and team members required, and the like. It may be apparent to any person skilled in the art that the number of FTEs required to be staffed on a project are estimated from the point of view of the second set of resources associated with second organization 104. It may be apparent to any person skilled in the art that first organization 102 outsources work to obtain cost and time benefits.

Second organization 104 prepares an estimate of the various resource factors associated with the project and presents the estimation to first organization 102. Second organization 104 uses resource module 106 to estimate the resource factors associated with the project. In an exemplary embodiment of the invention, first organization 102 outsources work of its entire team to second organization 104. Thereafter, resource module 106 calculates the amount of effort required by the second set of resources corresponding to the first set of resources, i.e., the team working on the project, the number of FTEs and project managers to be staffed on the project, and the like. Resource module 106 estimates the resource factors on the basis of various parameters associated with the project. The estimation of the various resource factors on the basis of different parameters are explained in detail in conjunction with FIG. 2. In another embodiment of the invention, first organization 102 and second organization 104 may refer to two groups of the same organization and resource module 106 estimates the resource factors accordingly.

Figure 2:
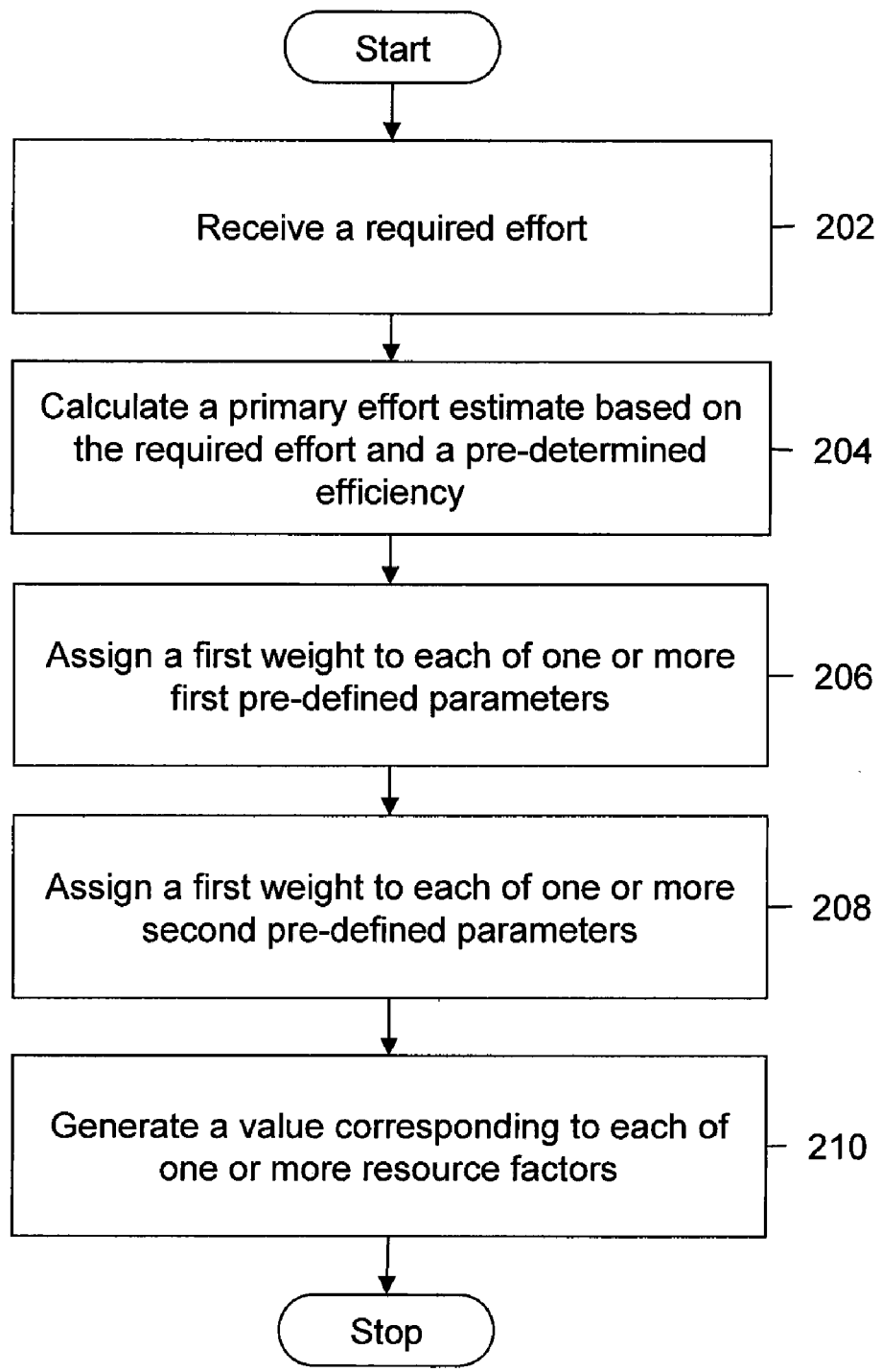
FIG. 2 is a flowchart of a method for estimating one or more resource factors associated with a steady state execution of a project, in accordance with an embodiment of the invention.

FIG. 2 is a flowchart of a method for estimating one or more resource factors associated with a steady state execution of a project, in accordance with an embodiment of the invention.

In various embodiments of the invention, one or more resource factors associated with a project are estimated. As described above, the resource factors are estimated for a second set of resources. The estimation of various resource factors is explained below in detail.

At 202, a required effort associated with the project is received. The required effort is associated with a first set of resources currently working on the project. Various examples of the first set of resources include, but are not limited to, the number of employees associated with a first organization who are currently working on the project, and a sub-unit of the first organization involved in performing a certain task which is now needed to be overtaken/undertaken by the second set of resources.

In an embodiment of the invention, the first organization provides the required effort in terms of the number of employees, in other words the first set of resources, currently working on the project that needs to be overtaken by the second set of resources. For example, the first organization may provide information related to the number of FTEs working on the project, for example, 65.5. It may be apparent to any person skilled in the art that the required effort can be calculated on the basis of the number of working hours that are available with the first set of resources. For example, there may be 1824 working hours available with the first set of resources in a particular year. Therefore, the required effort will be 65.5*1824=119742 hours. In another embodiment of the invention, the first organization provides the required effort in terms of the total number of hours taken by the first set of resources to execute a particular task that needs to be overtaken by the second set of resources.

At 204, a primary effort estimate is calculated for the second set of resources. In an embodiment of the invention, the primary effort estimate, on a broader level, enables a second organization to compare the effort available with the second set of resources to execute the project. The primary effort estimate is calculated on the basis of the required effort and a pre-determined efficiency. The pre-determined efficiency is the performance indicator of the second set of resources when compared with the first set of resources. In other words, the pre-determined efficiency is an added efficiency provided by the second set of resources. For example, the employees of the second organization may be 0 percent more efficient than the employees of the first organization, i.e., the second set of resources is as efficient as the first set of resources. Therefore, in the example above, the primary effort estimate is the required effort calculated at 202, i.e., 119742 hours. In an embodiment of the invention, the pre-determined efficiency is provided by a user.

At 206, a first weight is assigned to each of one or more first pre-defined parameters associated with one or more engagement characteristics of the project. The first pre-defined parameters enable the second organization to understand the requirements of the first organization in terms of project execution. For example, the way the project needs to be delivered to the first organization, and the like. Various examples of the first pre-defined parameters include, but are not limited to, Domain Experience of the second organization, Geographical Presence, Service Level Agreement (SLA) levels, Process Maturity, Need to work on the first organization's environment, Reporting and Governance, and so forth. These first pre-defined parameters are identified by experts. These experts are selected on the basis of their experience in project management and project execution, and can be renowned project managers, team leads, etc. Further, in various embodiments of the invention, the first pre-defined parameters are constant for different projects that are redirected to the second organization and are independent of the complexity of the project.

In various embodiments of the invention, the first weight is assigned by a user. The first weight is assigned on the basis of the requirements of the project, such as domain experience of the second set of resources in the domain of the project, whether the second organization has a geographic presence in proximity of the first organization, and the like. In various embodiments of the invention, the user may be a project manager, a team lead, and the like. In an embodiment of the invention, the first weight is assigned to each of the first pre-defined parameters on the basis of a pre-defined scale, such as a numeric scale, a character scale, and an alphanumeric scale. In another embodiment of the invention, each first pre-defined parameter has as an associated pre-defined scale. To illustrate further, in an example, the first weights (4, 3, 1, 2, 5, and 2) on a pre-defined scale of 1 to 5 may be assigned to the first pre-defined parameters, i.e., ('Domain Experience', 'Geographical Presence', 'SLA levels', 'Process Maturity', 'Need to work on the first organization's environment', 'Reporting and Governance') respectively.

At 208, a second weight is assigned to each of one or more second pre-defined parameters. In an embodiment of the invention, the second pre-defined parameters are associated with one or more portfolio characteristics of the project. The portfolio characteristics are related to the project that is to be overtaken by the second set of resources. For example, the project outsourced to the second set of resources can be related to the maintenance of a portfolio of an application containing more than hundred applications. In such cases, these parameters define the level of involvement required by the second set of resources at each stage of the project. Various examples of the second pre-defined parameters include, but are not limited to, infrastructure, client management, transition management, skill levels, portfolio complexity, production support, and the like. Further, in various embodiments of the invention, the second pre-defined parameters may vary on the basis of the project.

In an embodiment of the invention, various second pre-defined parameters mentioned above can be categorized separately, based on the resource factors that are required to be estimated. In other words, the second pre-defined parameters affecting a particular resource factor are grouped together. In an exemplary embodiment of the invention, the ratio of onsite and offsite deployment may have following second pre-defined parameters, 'Regulatory/Compliance', 'Infrastructure', 'Client management', 'Transition management', 'Portfolio management' and 'Technology diversity'. Further, the resource factor, the productivity improvement, may have 'Shared FTE at client side', 'Skill levels', 'Repeated nature of requests', '24×7 shift basis', 'Portfolio complexity' and 'Independent testing requirements'. Furthermore, Role ratio may have following second pre-defined parameters, 'Production support percentage in the portfolio', 'Portfolio has more than 50% of work in rare technologies' and 'Experience level of PAs available to staff on the project'. Further, as explained earlier, various second pre-defined parameters are identified and categorized by one or more experts who have significant experience in project management and project execution.

In various embodiments of the invention, the second weight is assigned by a user. The second weight is assigned on the basis of the requirements of the project, such as the level of infrastructure possessed by the second organization for the project, the level of client management required by the first organization, etc. In various embodiments of the invention, the user may be a project manager, a team lead, and the like. In an embodiment of the invention, the second weight is assigned to each of the second pre-defined parameters on the basis of a pre-defined scale such as a numeric scale, a character scale, and an alphanumeric scale. In another embodiment of the invention, each second pre-defined parameter has as an associated pre-defined scale.

To illustrate further, in an example, the second pre-defined parameters associated with a. the ratio of the onsite and offsite deployment are assigned (1, 1, 1, 1, 0), b. the productivity improvement are assigned (0, 1, 0, 1, 0, 1) and c. the role ratios are assigned ('>40%', 'Yes' and 'Same technology').

At 210, a value corresponding to each of the resource factors is generated. As explained earlier, the resource factors are the secondary effort estimate, the number of FTEs required for the project, the productivity improvement of the FTEs to be achieved over the period of time, the number of FTEs required for onsite and offsite, and the role ratio. The generation of the value corresponding to each of the resource factors is explained below in detail.

Firstly, a value corresponding to the productivity improvement to be achieved over the period of time, the number of FTEs required for onsite and offsite, and the role ratios is calculated on the basis of the weighted first pre-defined parameters and weighted second pre-defined parameters. In an embodiment of the invention, the values corresponding to the resource factors mentioned above are calculated in percentage.

In an embodiment of the invention, to calculate the percentage of FTEs required for onsite and offsite, an average of the first weights assigned to the first pre-defined parameters is calculated. Thereafter, the percentage of FTEs required for onsite and offsite is calculated on the basis of the average of the first weights assigned to the first pre-defined parameters and the sum of the second weights assigned to the second pre-defined parameters. Further, as explained earlier, a set of the second pre-defined parameters are categorized as the parameters affecting the ratio of FTEs required for onsite and offsite. Therefore, it may be apparent to any person skilled in the art that to calculate the sum of the second weights assigned to the second pre-defined parameters, only those parameters are considered from the second pre-defined parameters that affect the ratio of FTEs working onsite and offsite.

The formula used to calculate the percentage of FTEs onsite is (A+B−Sum[the second weight assigned to each second pre-defined parameters associated with onsite-offsite resource factor])/100; wherein A is greater than B.

The values corresponding to A and B differ on the basis of the average calculated for the first weights assigned to the first pre-defined parameters. In an embodiment of the invention, if the average of the first weight associated with each of the first pre-defined parameters is close to:

1 or 2 then (A, B) is (25, 5)
3 or 4 then (A, B) is (20, 5)
5 then (A, B) is (15, 5)

Following the example above provided at 206 and 208, the average of the first weights associated with the first pre-defined parameters is 3 and the sum of the second weights associated with the second pre-defined parameters associated with onsite-offsite resource factor is 4, thereby making the percentage of FTEs onsite 21 percent. Therefore, the percentage of FTEs offsite is 79 percent.

These percentages are calculated for the first year of the steady state execution of the project. Similarly, the percentage of FTEs required for onsite and offsite can be calculated for a certain period of time. For example, the percentage of FTEs required for onsite and offsite are calculated for five years. Further, to calculate for subsequent years, the values corresponding to A and B are varied accordingly.

The role ratio, or in other words, the percentage of managers, team leads, and so forth, that is required for the project is calculated. In an exemplary embodiment of the invention, the roles required for the steady state execution of the project are a project manager (PM), a programmer analyst (PA), a software engineer (SE), and a non-engineering background associate (NE).

In an embodiment of the invention, PM ratio is considered as 1. Further, in an embodiment of the invention, PA ratio is calculated on the basis of the average of the first weight assigned to respective one or more first pre-defined parameters. In an embodiment of the invention, PA ratio is calculated on the basis of the following conditions:

If the average of the first weights assigned to the first pre-defined parameters, i.e., 'Domain experience' and 'SLA levels' is calculated as 5, then the PA ratio is considered as 3. Else, if the average of the first weights assigned to the first pre-defined parameters, i.e., 'Domain experience' and 'SLA levels' is calculated as 1 or 2, then the PA ratio is considered as 4, and the like. Else, if the average of the first weights assigned to the first pre-defined parameters, i.e., 'SLA levels', is calculated as 1 or 2, then the PA ratio is 3. Else, if the average of the first weights assigned to the first pre-defined parameters, i.e., 'Domain experience', is calculated as 4, then the PA ratio is 4. Following the example above provided at 206 and 208, since 'SLA levels' are assigned as 1 at 206, the PA ratio is considered as 3.

Thereafter, the SE ratio is calculated. In an embodiment of the invention, the SE ratio is calculated by using the following formula:

SE ratio=20−X1−X2

X1 and X2 are determined on the basis of the second weights assigned to the second pre-defined parameters. The following are the conditions for the determination of X1 and X2:

If the second weight assigned to one of the second pre-defined parameters, i.e., 'Production support percentage in portfolio' is '>40%', then X1 is 5, else X1 is 0. Similarly, if the second weight assigned one of the second pre-defined parameters, i.e. 'Experience level of PAs available to staff the project' is equal to the 'Same Technology' then X2 is 5, else X2 is 0. Therefore, based on the second weights assigned at 208, the SE ratio is 10 (20-5-5).

Subsequently, NE ratio is calculated. In an embodiment of the invention, the following is the formula to calculate the NE ratio:

NE ratio=Y1+Y2−Y3+Y4

Y1, Y2, Y3 and Y4 are determined on the basis of the first weights and the second weights assigned to the corresponding first pre-defined parameters and the second pre-defined parameters. The following are the conditions for the determination of Y1, Y2, Y3 and Y4:

If the second weight assigned to one of the second pre-defined parameters, i.e., 'Portfolio has more than 50% work in rare technology' is assigned as 'Yes', then Y1 is 5. Else, if the average of the first weight assigned to various first pre-defined parameters, i.e. 'Domain experience', 'Geographical presence' and 'SLA levels' is 5, then Y1 is 10. Else, if the average of the first weight assigned to the various first pre-defined parameters, i.e., 'Domain experience', 'Geographical presence' and 'SLA levels' is 1 or 2, then Y1 is 5. Else, if the first weight assigned to one of the first pre-defined parameters, i.e. 'SLA levels' is 1 or 2, then Y1 is 5. Else, if the first weight assigned to one of the first pre-defined parameters, i.e., 'Domain experience' is 1 or 2, then Y1 is 10. Similarly, if the second weight assigned to the one of the second pre-defined parameters, i.e., 'Production support percentage in portfolio is '>40%', then Y2 is 5. Further, if the second weight assigned to the one of the second pre-defined parameters, i.e., 'Production support percentage in portfolio' is '<20%' then Y3 is 5. Furthermore, if the second weight assigned to the one of the second pre-defined parameters, i.e., 'Experience level of PAs available to staff the deal' is "Same technology" then Y4 is 5.

Therefore, based on the first weights and second weights assigned at 206 and 208, the NE ratio is calculated as 0.

In an embodiment of the invention, the role ratio for onsite and offsite, in other words, the percentage of PMs, PAs, SEs and NEs required for onsite and offsite, is calculated by using following formulae:

PM %=[PM ratio/Sum(PM ratio+PA ratio+SE ratio+NE ratio)]*100

PA %=[PA ratio/Sum(PM ratio+PA ratio+SE ratio+NE ratio)]*100

SE %=[SE ratio/Sum(PM ratio+PA ratio+SE ratio+NE ratio)]*100

NE %=100−Sum(PM %+PA %+SE %)

Therefore, based on the ratios calculated for each of the role, i.e., PM, PA, SE and NE and the formulae mentioned above, the percentage for each one of them is calculated as 7 percent, 21 percent, 71 percent and 1 percent, respectively.

Thereafter, productivity improvement is calculated. In an embodiment of the invention, the productivity improvement is calculated for a period of time, for example, in period of months, such as bi annually. To further illustrate, if the period of time is 2 years, then the productivity improvement may be calculated for four periods each of six months, in other words, first for initial six months, then for the subsequent six months, and so on. In an embodiment of the invention, based on the various conditions mentioned below, the productivity improvement is calculated for the first one year of the steady state execution of the project.

In an embodiment of the invention, the productivity improvement for the first six months is always considered as 0 percent. Thereafter, for the next six months, if the average of the first weights assigned to the first pre-defined parameters, i.e., ('Domain experience', 'SLA levels', 'Process maturity') is 1 or 2 and simultaneously the second weight assigned to the second pre-defined parameter, i.e., ('Skill level') is 0, then the productivity increase in the first 12 months (PI 12) is 0 percent. Further, if the average of the first weights assigned to the first pre-defined parameters, i.e., ('Domain experience', 'SLA levels', 'Process maturity') is 1 or 2, then 'PI 12' is considered as 2 percent. Furthermore, if the average of the first weights assigned to the first pre-defined parameters, i.e., ('Domain experience', 'SLA levels', 'Process maturity') is 5 or 3 or 4 and the second weight assigned to second pre-defined parameter, i.e., ('Skill level') is 0, then 'PI 12' is 1 percent. Also, if the average of the first weights assigned to the first pre-defined parameters, i.e., ('Domain experience', 'SLA levels', 'Process maturity') is 5 or 3 or 4, then 'PI 12' is considered as 3 percent. Based on the first weights and the second weights assigned in the example mentioned above at 206 and 208 and the conditions mentioned above, 'PI 12' is considered as 2 percent.

It may be apparent to any person skilled in the art that for the subsequent years based on the similar conditions mentioned above, the productivity improvement for a period of time, for example, five years, can be calculated.

Thereafter, the number of FTEs is calculated on the basis of the primary effort estimate calculated at 204, the weighted first pre-defined parameters, the weighted second pre-defined parameters and the available time with the second set of resources associated with the second organization.

Firstly, the secondary effort estimate is calculated. The secondary effort estimate is the exact number of hours that is available with the second set of resources to execute the project. In an embodiment of the invention, the secondary effort estimate is calculated on the basis the primary effort estimate and the weighted first pre-defined parameters. The formula used to calculate the secondary effort estimate is the primary effort estimate+(Z*the primary effort estimate), where, Z is calculated on the basis of the weighted first pre-defined parameters.

The formula to calculate Z is ((2−the first weight assigned to 'Domain Experience')*7%)/2.5+((2−the first weight assigned to 'Geographical Presence')*0%)/2.5+((2−the first weight assigned to 'SLA levels')*9%)/2.5+((2−the first weight assigned to 'Process Maturity')*2%)/2.5+((2−the first weight assigned to 'Need to work on the first organization's environment')*5%)/2.5+((2−the first weight assigned to 'Reporting and Governance')*2%)/2.5+(the first weight assigned to 'Domain Experience')/502+(the first weight assigned to 'Reporting and Governance')/502+(the first weight assigned to 'SLA levels')/502+(the first weight assigned to 'Process Maturity')/502+(the first weight assigned to Need to work on the first organization's environment)/502

Therefore, based on the first weights assigned to the first pre-defined parameters at 206 and the primary effort estimate (119742 hours) calculated at step 204, the secondary effort estimate is calculated as 113498 hours, i.e., 119742+(−0.05*119742).

Subsequently, based on the percentages calculated earlier associated with onsite and offsite and the available time, the number of FTEs is calculated. For example, if the time available with second set of resources in a year is 1888 hours, then the number of FTEs to be staffed onsite for a year is 12.62, i.e., [113498*21/100]/1888. Similarly, the number of FTEs to be staffed on offsite is 45.05, i.e., [113498*79/100]/1888. Therefore, the total number of FTEs to be staffed on the project is 57.7, in other words, 57 or 58. In another embodiment of the invention, the user may select to calculate the number of FTEs for a period of time, for example, six months, year, 2 years, and the like.

Thereafter, the number of FTEs is calculated, the number of PMs, PAs, SEs and NEs, and the productivity improvement are calculated accordingly. For example, 1 project manager is required to be staffed onsite and 3 project managers are required to be staffed offsite, based on the percentage calculated earlier for PM (7%), i.e., $7/100*12.62$ and $7/100*45.05$, respectively. Further, as stated in the example mentioned earlier, the productivity improvement to be achieved in 1 year was calculated as 2 percent, i.e., 111229 Hours [113498*98/100].

In various embodiments of the invention, the value corresponding to any of the resource factors can be changed by a user on the basis of his/her experience in project management and project execution. As explained earlier, the user can be a project manager, a team lead, and the like.

Figure 3:
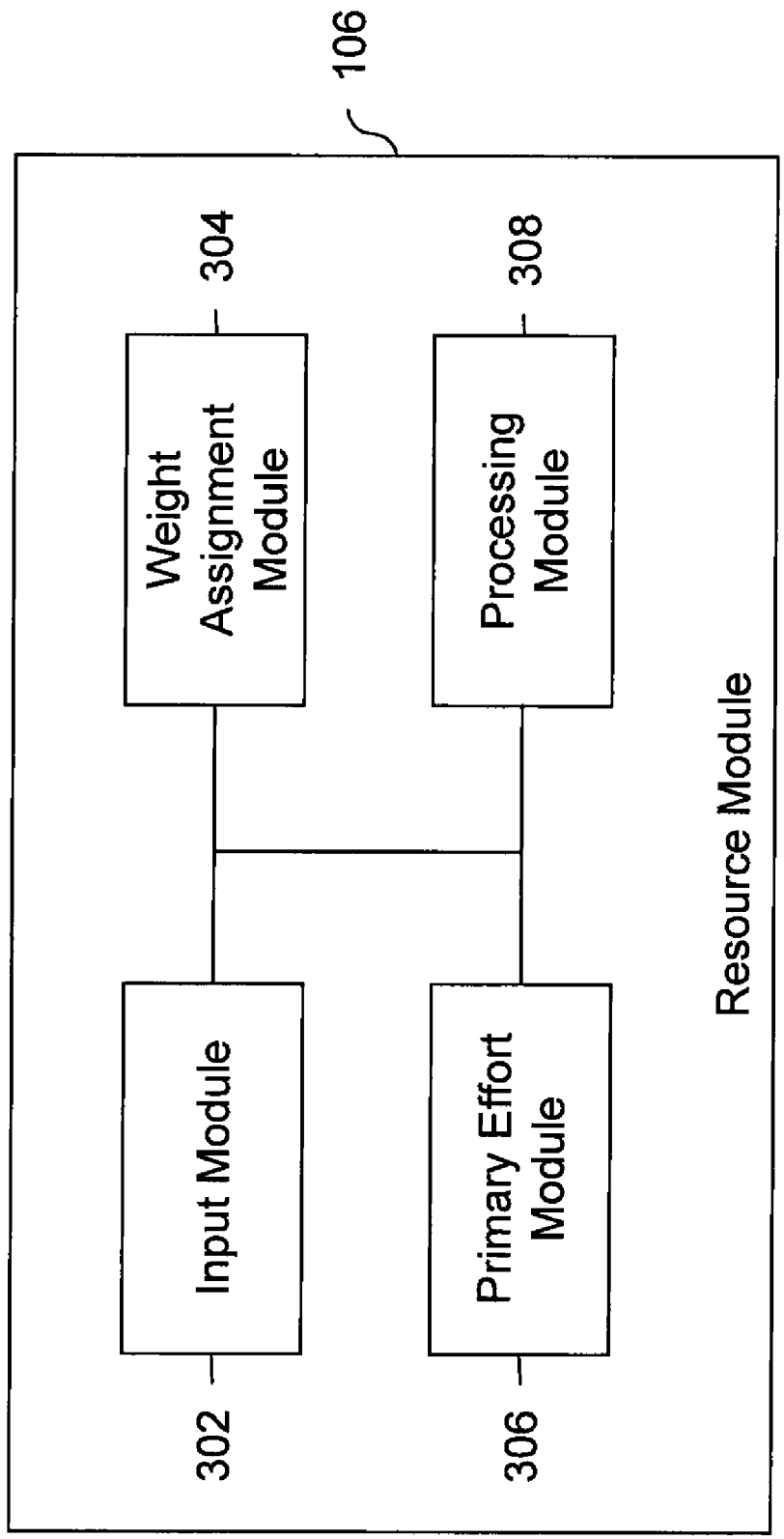
FIG. 3 is a block diagram of a resource module estimating one or more resource factors associated with a steady state execution of a project, in accordance with an embodiment of the invention.

FIG. 3 is a block diagram of resource module 106 used for estimating one or more resource factors for a steady state execution of a project, in accordance with an embodiment of the invention. Resource module 106 includes an input module 302, a weight assignment module 304, a primary effort module 306 and a processing module 308.

In various embodiments of the invention, resource module 106 estimates one or more resource factors associated with a project. In an embodiment of the invention, the project may be outsourced to a second set of resources associated with second organization 104 by first organization 102. As explained earlier, the project is executed by a first set of resources associated with first organization 102. In another embodiment of the invention, first organization 102 and second organization 104 may refer to two groups of the same organization and resource module 106 estimates the resource factors accordingly for a team that wants to execute the work of the another team.

Various examples of the resource factors include, but are not limited to, a secondary effort estimate, the number of FTEs required for the project, the productivity improvement of the FTEs to be achieved over a period of time, the number of FTEs required for onsite and offsite, and the role ratio. In an embodiment of the invention, the roles considered for the steady state execution of the project are project managers, programmer analysts, software engineers, and non-engineering background graduates.

Input module 302 receives a required effort associated with the project. The required effort is associated with the first set of resources. In an embodiment of the invention, the required effort is provided by first organization 102. Further, the required effort is provided in total number of hours that is spent currently by the first set of resources associated with first organization 102, for example, 119742 hours in a year. Further, the required effort can also be provided by providing the number of the first set of resources currently working on the project and the number of available working hours associated with the first set of resources. For example, the number of first set of resources is 65.5 and the available working hours are 1824 hours. In various embodiments of the invention, the required effort is a numeric value.

Input module 302 receives a first weight and a second weight corresponding to each of one or more first pre-defined parameters and one or more second pre-defined parameters. The first pre-defined parameters are associated with engagement characteristics of the project. Further, the first pre-defined parameters are explained in detail in conjunction with FIG. 2.

Similarly, the second pre-defined parameters are associated with the portfolio characteristics of the project. The portfolio characteristics relate to the project to be overtaken by the second set of resources. For example, the project outsourced to second organization 104 can be the portfolio of more than hundred applications. In such cases, these parameters define the level of involvement required by the second set of resources at each stage of the project. Further, the second pre-defined parameters are explained in detail in conjunction with FIG. 2.

In various embodiments of the invention, the first weight and the second weight are provided by a user, based on a pre-defined scale associated with each of the first pre-defined parameters and the second pre-defined parameters accordingly. The first weight and the second weights are provided on the basis of the requirements of the project. These requirements have been explained in detail in conjunction with FIG. 2. In an embodiment of the invention, the first weight and the second weight can be a numeric, a character, an alphanumeric value. For example, the user assigns 2 to a first pre-defined parameter on a scale of 1 to 5. In various embodiments of the invention, the user can be an experienced project manager, a team lead, and the like.

Input module 302 receives a pre-determined efficiency. The pre-determined efficiency is the performance indicator of the second set of resources when compared with first set of resources. In other words, the pre-determined efficiency is an added efficiency provided by the second set of resources. For example, the employees of second organization 104 may be 4 percent more efficient than the employees of first organization 102. In various embodiments of the invention, the pre-determined efficiency is provided by the user. In various embodiments of the invention, input module 302 can be implemented in the form of a Graphical User Interface (GUI).

Weight assignment module 304 assigns the first weight and the second weight corresponding to each of the first pre-defined parameters and the second pre-defined parameters. For example, if the user provides 2 as the first weight for one of the first pre-defined parameters through input module 302, then weight assignment module 304 assigns the first weight accordingly.

Primary effort module 306 calculates a primary effort estimate (PEE) on the basis of the required effort (RE) and the pre-determined efficiency (E). The primary effort estimate, on a broader level, enables second organization 104 to compare the effort available with the second set of resources to execute the project. In an embodiment of the invention, the primary effort estimate is the product of the required effort and the pre-determined efficiency. In an exemplary embodiment of the invention, the formula used to calculate the primary effort estimate is PEE=RE*(1−E/100). For example, if RE is 119742 hours and E is 0 percent, then PEE is 119742 hours.

Processing module 308 generates a value corresponding to each of the resource factors. For example, processing module 308 generates the secondary effort estimate. As described earlier, the secondary effort estimate is the exact number of hours that is available with the second set of resources to execute the project. In an embodiment of the invention, the secondary effort estimate is generated on the basis of the primary effort estimate and the weighted first pre-defined parameters. Further, the formula to calculate the secondary effort estimate is explained in detail in conjunction with FIG. 2. Following the example above, the secondary effort estimate is 113498 hours.

Similarly, processing module 308 generates a value corresponding to various other resource factors such as, the number of FTEs to be staffed on the project, the onsite and offsite ratio, and the role ratio. Further, the calculation of the value corresponding to each of the resource factors is explained in detail in conjunction with FIG. 2.

In various embodiments of the invention, the value corresponding to any of the resource factors can be changed by a user on the basis of his/her experience in project management and project execution. As explained earlier, the user can be a project manager, a team lead, and the like.

In various embodiments of the invention, input module 302, weight assignment module 304, primary effort module 306, and processing module 308 can be implemented in the form of hardware, software, firmware, and/or combinations thereof.

The system for estimating one or more resource factors associated with a steady state execution of a project, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for estimating one or more resource factors associated with a steady state execution of a project. The computer program product includes a computer usable medium having a set program instructions comprising a program code for estimating one or more resource factors associated with a steady state execution of a project. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

What is claimed is:

1. A method for operating a data processor to estimate one or more resource factors associated with a steady state execution of a project by a second set of resources, the method comprising:
  a. receiving a required effort through an I/O interface coupled to the data processor, wherein the required effort is estimated for a first set of resources executing the project;
  b. calculating using the data processor, a primary effort estimate, wherein the primary effort estimate being calculated based on the required effort and a pre-determined efficiency, the primary effort estimate being calculated for the project, wherein the pre-determined efficiency is based on the performance of the second set of resources in comparison to the performance of the first set of resources;
  c. assigning in a memory a first weight to each of one or more first pre-defined parameters, wherein the one or more first pre-defined parameters are associated with engagement characteristics of the project, the first weight being assigned based on one or more requirements of the project;
  d. assigning in the memory a second weight to each one of one or more second pre-defined parameters, wherein the one or more second pre-defined parameters are associated with portfolio characteristics of the project, the second weight being assigned based on one or more requirements of the project; and
  e. generating using the data processor a value corresponding to each of the one or more resource factors based on at least one of the primary effort estimate, available time with the second set of resources and at least one of the weighed one or more first pre-defined parameters and the weighted one or more second pre-defined parameters, wherein the available time is calculated based on the number of working hours in a pre-defined period of time.

2. The method according to claim 1 further comprising categorizing at least one of the one or more first pre-defined parameters into one or more categories associated with at least one of the one or more resource factors, the one or more first pre-defined parameters being categorized by a user.

3. The method according to claim 1 further comprising categorizing at least one of the one or more second pre-defined parameters into one or more categories associated with at least one of the one or more resource factors, the one or more second pre-defined parameters being categorized by a user.

4. The method according to claim 1 further comprising generating the value corresponding to each of the one or more resource factors for a period of time.

5. The method according to claim 1, wherein the one or more resource factors are at least one of a secondary effort estimate, the number of Full Time Equivalents (FTEs), a role ratio, productivity improvement and a ratio of onsite FTE to offsite FTE.

6. The method according to claim 5, wherein the secondary effort estimate is the product of the primary effort estimate and the weighted one or more first pre-defined parameters.

7. The method according to claim 1, wherein the first set of resources is at least one of an organization and a sub-unit of an organization.

8. The method according to claim 1, wherein the second set of resources is at least one of an organization and a sub-unit of an organization.

9. The method according to claim 1, wherein the first weight and the second weight is assigned by a user based on one or more pre-defined scales, each of the one or more pre-defined scales being associated with each one of the one or more first pre-defined parameters and each one of the one or more second pre-defined parameters.

10. The method according to claim 1, wherein the pre-determined efficiency is provided by a user.

11. A resource module for estimating one or more resource factors associated with a steady state execution of a project by a second set of resources, the resource module comprising:
   a. a processor for processing data;
   b. a memory for storing data;
   c. an I/O interface coupled to the processor for receiving data;
   d. an input module configured for receiving a required effort, the required effort being associated with a first set of resources executing the project;
   e. a primary effort module configured for calculating a primary effort estimate, the primary effort estimate being calculated based on the required effort and a pre-determined efficiency, the primary effort estimate being calculated for the project, wherein the pre-determined efficiency is based on the performance of the second set of resources in comparison to the performance of the first set of resources;
   f. a weight assignment module configured for
      i. assigning a first weight to each of one or more first pre-defined parameters, wherein the one or more first pre-defined parameters are associated with engagement characteristics of the project, the first weight being assigned based on one or more requirements of the project;
      ii. assigning a second weight to each one of one or more second pre-defined parameters, wherein the one or more second pre-defined parameters are associated with portfolio characteristics of the project, the second weight being assigned based on one or more requirements of the project; and
   g. a processing module configured for generating a value corresponding to each of the one or more resource factors based on at least one of the primary effort estimate, available time with the second set of resources and at least one of the weighed one or more first pre-defined parameters and the weighted one or more second pre-defined parameters, wherein the available time is calculated based on the number of working hours in a pre-defined period of time.

12. The resource module according to claim 11, wherein the processing module is further configured for generating the value corresponding to each of the one or more resource factors for a period of time.

13. The resource module according to claim 11, wherein the input module is further configured for receiving the first weight and the second weight by a user based on one or more pre-defined scales, each of the one or more pre-defined scale being associated with each one of the one or more first pre-defined parameters and each one of the one or more second pre-defined parameters.

14. The resource module according to claim 11, wherein the input module is further configured for receiving the pre-determined efficiency by a user.

15. The resource module according to claim 11, wherein the one or more resource factors are at least one of a secondary effort estimate, the number of Full Time Equivalents (FTEs), a role ratio, productivity improvement and the ratio of onsite FTE to offsite FTE.

16. The resource module according to claim 15, wherein the processing module generates the secondary feedback by multiplying the primary effort estimate and the weighted one or more first pre-defined parameters.

17. A computer program product for use with a computer, the computer program product comprising a non-transitory computer usable medium having a computer readable program code embodied therein for estimating one or more resource factors associated with a steady state execution of a project by a second set of resources, the computer readable code comprising instructions for:
   a. receiving a required effort, wherein the required effort is estimated for a first set of resources executing the project;
   b. calculating a primary effort estimate, wherein the primary effort estimate being calculated based on the required effort and a pre-determined efficiency, the primary effort estimate being calculated for the project, wherein the pre-determined efficiency is based on the performance of the second set of resources in comparison to the performance of the first set of resources;
   c. assigning a first weight to each of one or more first pre-defined parameters, wherein the one or more first pre-defined parameters are associated with engagement characteristics of the project, the first weight being assigned based on one or more requirements of the project;
   d. assigning a second weight to each one of one or more second pre-defined parameters, wherein the one or more second pre-defined parameters are associated with portfolio characteristics of the project, the second weight being assigned based on one or more requirements of the project; and
   e. generating a value corresponding to each of the one or more resource factors based on at least one of the primary effort estimate, available time with the second set of resources and at least one of the weighed one or more first pre-defined parameters and the weighted one or more second pre-defined parameters, wherein the available time is calculated based on the number of working hours in a pre-defined period of time.

18. The computer program product according to claim 17, wherein the computer readable code further performs generating the value corresponding to each of the one or more resource factors are for a period of time.

19. The computer program product according to claim 17, wherein the one or more resource factors are at least one of a secondary effort estimate, the number of Full Time Equivalents (FTEs), a role ratio, productivity improvement and the ratio of onsite FTE to offsite FTE.

20. The computer program product according to claim 19, wherein the secondary effort estimate is the product of the primary effort estimate and the weighted one or more first pre-defined parameters.

* * * * *